United States Patent [19]

Chakko

[11] Patent Number: 5,286,014
[45] Date of Patent: Feb. 15, 1994

[54] SLIPPER BUSHING WITH IMPROVED AXIAL LOAD CAPACITY

[75] Inventor: Mathew K. Chakko, Wabash, Ind.

[73] Assignee: GenCorp Inc., Fairlawn, Ohio

[21] Appl. No.: 16,617

[22] Filed: Feb. 12, 1993

[51] Int. Cl.$^5$ .............................. F16F 1/44; F16F 7/00
[52] U.S. Cl. .................. 267/293; 267/141.2; 384/397
[58] Field of Search ............ 267/293, 276, 281, 141.2, 267/140.4, 140.2, 140.5, 141.1, 141.3–141.7, 153; 384/291, 292, 293, 297; 280/673, 700, 717, 721, 716

[56] References Cited

U.S. PATENT DOCUMENTS

| | | | |
|---|---|---|---|
| 2,221,884 | 11/1940 | Schmidt | 267/141.7 |
| 2,659,619 | 11/1953 | Kishline et al. | 267/293 |
| 4,477,197 | 10/1984 | Choate | 384/297 |
| 4,767,108 | 8/1988 | Tanaka et al. | 267/293 X |
| 4,809,960 | 3/1989 | Kakimoto et al. | 267/293 X |
| 5,100,114 | 3/1992 | Reuter et al. | 267/141.2 X |
| 5,139,244 | 8/1992 | Chakko | 267/293 |

FOREIGN PATENT DOCUMENTS

| | | | |
|---|---|---|---|
| 1525041 | 8/1969 | Fed. Rep. of Germany | 384/297 |
| 0127934 | 6/1986 | Japan | 267/276 |
| 0213019 | 6/1924 | United Kingdom | 267/141.3 |

Primary Examiner—Andres Kashnikow
Assistant Examiner—Peter M. Poon

[57] ABSTRACT

A slipper bushing is described as being comprised of a number of succeedingly larger cylindrical sleeves, beginning with a rigid, inner sleeve, followed by a polymeric sleeve, then a resilient elastomeric sleeve, and finally, a rigid, outer sleeve. The inner cylindrical surface of the elastomeric sleeve abutting the outer cylindrical surface of the polymeric sleeve, is provided with a number of circumferentially oriented grooves. A lubricant is placed between the interfaces of the polymeric and elastomeric sleeves and moves into and out of the grooves, as the bushing operates. End caps are used at the flange and barrel ends of the slipper bushing to cover the sleeves and seal the interfaces between them from contaminants.

7 Claims, 1 Drawing Sheet

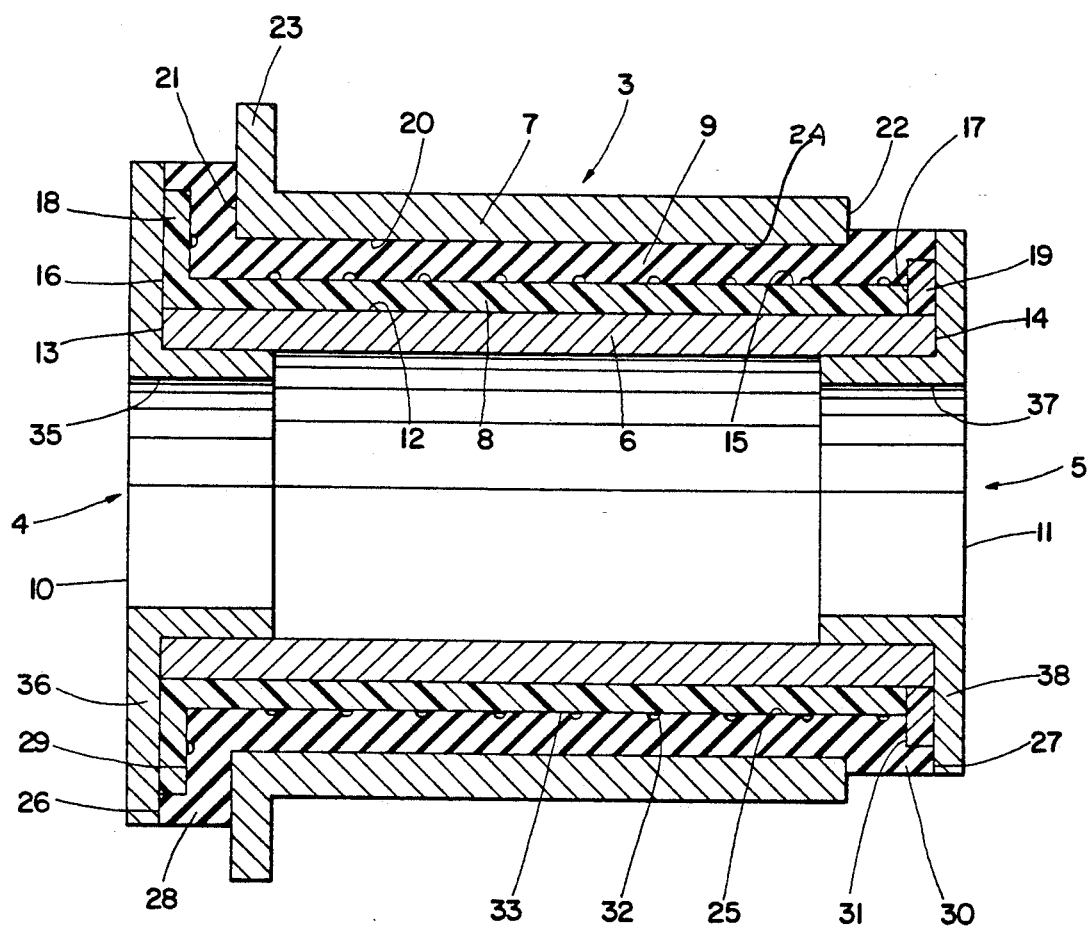

SLIPPER BUSHING WITH IMPROVED AXIAL LOAD CAPACITY

BACKGROUND OF THE INVENTION

The invention relates to bushings, and especially to slipper bushings which are mainly used in automobile suspension systems to provide relative rotation or slippage between rigid inner and outer sleeves of the bushing. This is conventionally accomplished by using a resilient, tubular rubber insert or sleeve which is bonded or press fitted to one of the metal sleeves.

U.S. Pat. Nos. 3,171,699, 3,215,477, 3,300,257, 4,671,678 and 5,100,114 are typical of the many patents relating to simple bushings which employ a resilient elastomeric insert, with or without metal reinforcement, between rigid, inner and outer metal sleeves. U.S. Pat. Nos. 4,744,677, 4,767,108 and 4,809,960 relate to more sophisticated bushings.

U.S. Pat. No. 5,139,244 discloses a unique slipper bushing which essentially comprises; (i) a hollow, cylindrical, inner metal sleeve, (ii) a specially shaped, resilient elastomeric insert or sleeve which is force fitted around the inner metal sleeve, (iii) an outer polymeric sleeve which surrounds the elastomeric sleeve in abutting relation, such that relative movement between the elastomeric and polymeric sleeves can occur, (iv) a lubricant between the interfaces of the elastomeric and polymeric sleeves to facilitate such relative movement, and (v) a pair of hollow, metal end caps force fitted to the opposing ends of the inner metal sleeve. The slipper bushing has good performance characteristics. However, it has been found that under very severe loading, the elastomeric sleeve becomes axially distorted or tends to extend over the end caps at its opposing ends, to adversely affect operation of the bushing. The slipper bushing of this invention is designed to eliminate or substantially reduce this problem by providing a structure with a highly improved capacity for resisting lateral or axial loads without becoming distorted excessively.

Briefly stated, the invention is in a slipper bushing which essentially comprises a hollow, rigid, cylindrical inner sleeve, a polymeric sleeve secured around the inner sleeve, a resilient elastomeric insert or sleeve surrounding the polymeric sleeve in abutting relation therewith, a lubricant between the abutting interfaces or surfaces of the polymeric and elastomeric sleeves, a rigid outer sleeve to which the polymeric sleeve is mold bonded and a pair of rigid, hollow end caps for sealing the opposing ends of the bushing, especially the lubricated interfaces between the polymeric and elastomeric sleeves. The lubricated interfaces are provided with a plurality of circumferentially oriented grooves in which the lubricant is free to move in and out of.

It can be appreciated from the above brief description that the highly deformable resilient elastomeric sleeve is bonded to the rigid outer sleeve, to resist the distortion caused by lateral and axial loads contrary to my aforementioned '244 patent where the resilient elastomeric sleeve is secured to the rigid inner sleeve.

DESCRIPTION OF THE DRAWING

The following description of the invention will be better understood by having reference to the drawing which is a longitudinal cross-section of a slipper bushing which is made in accordance with the invention.

DETAILED DESCRIPTION OF THE DRAWING

With reference to the drawing, there is shown a slipper bushing 3 which has a larger diameter flange end 4 that is oppositely spaced from a smaller diameter barrel end 5. The slipper bushing 3 essentially comprises a hollow, innermost rigid sleeve 6, a hollow, outermost rigid sleeve 7, two intermediate sleeves 8 and 9 disposed between the inner and outer sleeves 6 and 7, and a pair of annular, rigid end caps 10 and 11 which are force fitted to the flange and barrel ends 4 and 5 of the slipper bushing 3. The opposing ends of the different sleeves 6–9 will hereafter be labeled "flange" or "barrel" depending on their proximity to the flange and barrel ends 4 and 5 of the slipper bushing 3.

The rigid, inner sleeve 6 is cylindrically shaped and composed of any suitable rigid material, such as steel. The inner sleeve 6 has an outer cylindrical surface 12 between an annular flange end 13 and an opposing, annular barrel end 14.

The first intermediate sleeve 8, closest to the inner sleeve 6, is composed of any appropriate engineering thermoplastic material, such as nylon, polypropylene, polyester, or polyphenylene sulfide, with or without fiber reinforcement. This first intermediate sleeve is sometimes referred to as the polymeric sleeve. The polymeric sleeve 8 is press fitted or molded over the outer, cylindrical surface 12 of the inner sleeve 6, and has a generally smooth, outer cylindrical surface 15 between an annular flange end 16 and an opposing, annular barrel end 17. An integrally formed, annular flange 18 is at the flange end 16 of the polymeric sleeve 8 and has an outer face which is in planar relation with the adjacent opposing flange end 13 of the inner sleeve 6. The annular flange 18 of the polymeric sleeve 8 extends radially outwardly from the inner sleeve 6 and surrounding polymeric sleeve 8. A separate annular ring or washer 19 is disposed at the opposing, annular barrel end 17 of the polymeric sleeve 8 in surrounding relation around the inner sleeve 6 and has an outer face which is in planar relation with the adjacent, annular barrel end 14 of the inner sleeve 6. The washer 19 is composed of a similar polymeric material and is provided to facilitate assembly of the slipper bushing 3.

The rigid, outer sleeve 7 is, likewise, composed of any suitable rigid material, such as steel, and is cylindrically shaped with a smooth, inner cylindrical surface 20 between an annular flange end 21 and an opposing, annular barrel end 22. An integrally formed, annular flange 23 is at the flange end 21 of the outer sleeve 7, and is in parallel relation with the adjacent, annular flange 18 of the polymeric sleeve 8, and extends radially outwardly from the inner sleeve 6 beyond the annular flange 18 of the polymeric sleeve 8. The annular, barrel end 22 of the outer sleeve 7 terminates in spaced relation from the polymeric washer 19.

The second, intermediate sleeve 9, closest to the outer sleeve 7, is composed of any appropriate, resilient elastomeric material, such as rubber, and is mold bonded to the inner cylindrical surface 20 of the outer sleeve 7. The elastomeric sleeve or insert 9 has radially spaced, smooth outer and inner cylindrical surfaces 24 and 25 between an annular flange end 26 and an opposing, annular barrel end 27. A large, integrally formed, annular flange 28 with an outwardly facing, annular recess or cavity 29 for receiving the adjacent, outstanding matching flange 18 of the polymeric sleeve 8, is disposed at the flange end 26 of the elastomeric sleeve 9.

A small, integrally formed, annular flange 30 with an outwardly facing, annular recess or cavity 31 for receiving the adjacent, matching washer 19, is disposed at the barrel end 27 of the elastomeric insert 9 in parallel relation with the larger annular flange 28 of the elastomeric sleeve 9. The inner cylindrical surface 25 of the elastomeric sleeve 9 interfaces with, i.e. abuts, the outer cylindrical surface 15 of the polymeric sleeve 8, and is provided with a number of circumferentially oriented grooves, e.g. groove 32, which are designed to contain therein, a lubricant 33, such as a silicone based grease, which is placed between the lateral and cylindrical interfaces of the polymeric sleeve 8 and the elastomeric sleeve 9, to facilitate relative movement between these sleeves 8 and 9 and especially the continuous free or low frictional rotation between the rigid, inner and outer sleeves 6 and 9. The lubricant 33 is sheared and displaced inside the slipper bushing 3, as it enters and exits the grooves 32 in the inner cylindrical surface 25 of the elastomeric sleeve 9, when the slipper bushing 5 is in operation. Such action of the lubricant is believed to enhance the dampening, vibration absorption and isolation characteristics of the slipper bushing 3 of the invention and the suspension systems in which such bushings are used. A similar lubricant can be used between the interfaces of the washer 19 and the elastomeric sleeve 9. If desired, a circular lubrication groove 32 can be placed in the surface of the annular recess 29 of the larger elastomeric flange 23, abutting the annular polymeric flange 18.

The first end cap 10 at the flange end 4 of the slipper bushing 3, comprises a hollow, metal cylinder 35 which is integral with and disposed at right angles to an annular flange 36 which is designed to cover the adjacent flange end 13 of the inner sleeve 6, the annular flange 18 of the polymeric sleeve 8, and the annular flange 28 of the elastomeric sleeve 9, and seal the interfaces between these three sleeves, and especially the lubricated interfaces between the sleeves 8 and 9.

The second end cap 11 at the barrel end of the slipper bushing 3, is similar in shape, but oppositely disposed to the first end cap 10, when both of the end caps 10 and 11 are press fitted on the slipper bushing 3. The second end cap 11 comprises a hollow metal cylinder 37 which is integral with and disposed at right angles to a smaller annular flange 38, which is designed to cover the adjacent barrel end 14 of the inner sleeve 6, the washer 19, and the smaller, annular, elastomeric flange 30 and seal the interfaces between these components, especially the lubricated interfaces between the polymeric sleeve 8, the elastomeric sleeve 9 and the washer 19.

Thus, there has been described a unique slipper bushing which has slip surfaces which are non-metallic to minimize corrosion problems in the slipper bushing. Moreover, this slipper bushing has highly improved axial and lateral load capabilities because of the flanges provided in the polymeric sleeve and the resilient elastomeric sleeve which is secured to the rigid outer sleeve to resist the axial and lateral loads confronted by the slipper bushing. Further, this slipper bushing is designed to provide better vibration isolation and absorption as well as lubricated interfaces with better seals against contaminants.

What is claimed is:

1. A slipper bushing having a flange end opposite a barrel end, comprising;

(a) a hollow, rigid inner sleeve having an outer cylindrical surface defined between a pair of opposing, annular ends adjacent the flange and barrel ends of the bushing and which is radially spaced from a center bore which extends longitudinally through the inner sleeve;

(b) a flat annular washer surrounding the inner sleeve at the annular end of the sleeve adjacent the barrel end of the bushing;

(c) a polymeric sleeve, secured around the outer cylindrical surface of the inner sleeve in concentric relation therewith, said polymeric sleeve having an outer cylindrical surface which is radially spaced from the outer cylindrical surface of the inner sleeve, and which is defined between a pair of opposing annular ends adjacent the flange and barrel ends of the busing, the end of said polymeric sleeve adjacent the flange end of the bushing including a flat annular flange which extends radially from the inner sleeve and the end of said polymeric sleeve adjacent the barrel end of the busing, which is in abutting relation with the washer;

(d) a sleeve, composed of resilient elastomeric material, surrounding the polymeric sleeve in concentric relation, the elastomeric sleeve having, (i) an inner cylindrical surface, which is in abutting relation with the outer cylindrical surface of the polymeric sleeve, and (ii) an outer cylindrical surface which is radially spaced from the inner cylindrical surface and defined between a first integrally formed flat annular flange at the flange end of the bushing and a second smaller diameter flat annular flange at the barrel end of the bushing, the first and second annular flanges having outwardly facing annular recesses for matingly receiving the annular flange of the polymeric sleeve and the washer respectively, one of the abutting cylindrical surfaces of the elastomeric and polymeric sleeves having therein, a number of circumferentially oriented grooves which are spaced longitudinally of the elastomeric and polymeric sleeve in side-by-side relation;

(e) a lubricating flowing in the grooves during operation of the bushing to lubricate the abutting surfaces of the polymeric and elastomeric sleeves;

(f) a rigid cylindrical outer sleeve secured to the outer cylindrical surface of the elastomeric sleeve in concentric surrounding relation around the elastomeric sleeve between the annular flanges thereof, the outer sleeve having an annular flange adjacent the flange end of the bushing in parallel relation from the annular flange of the polymeric sleeve, such that at least a portion of the elastomeric annular flange, adjacent the flange end of the bushing, is sandwiched between the annular flanges of the outer and polymeric sleeves;

(g) a first hollow cylindrical end cap secured in the bore of the inner sleeve at the flange end of the bushing, the end cap having a radially extending flat annular flange which covers the annular end of the inner sleeve adjacent the flange end of the bushing, and the annular flanges of the elastomeric and polymeric sleeves adjacent the flange end of the busing, and seals the interfaces between such sleeves; and (g) a second hollow cylindrical end cap secured in the bore of the inner sleeve at the barrel end of the bushing in oppositely disposed relation to the first end cap at the flange end of the bushing, the second end cap having a radially extending flat annular flange which covers the annular end of the inner sleeve adjacent the barrel end of the bushing, and the washer and annular flange of the elastomeric sleeve adjacent the barrel end of the bushing and seals the interfaces between such washer and sleeves.

2. The slipper bushing of claim 1, wherein the grooves are disposed in the abutting, cylindrical surface of the elastomeric sleeve.

3. The slipper bushing of claim 2, wherein the annular flange of the outer sleeve extends radially beyond the adjacent annular elastomeric flange.

4. The slipper bushing of claim 3, wherein the washer is composed of polymeric material.

5. The slipper bushing of claim 4, wherein the resilient elastomeric material is rubber.

6. The slipper bushing of claim 5, wherein the polymeric material is composed of material selected from the group of nylon, polypropylene, polyester and polyphenylene.

7. The slipper bushing of claim 6, wherein the inner and outer sleeves and the end caps are composed of metal.

* * * * *